UNITED STATES PATENT OFFICE 2,350,388
ESTERS OF ACETYLLACTYLLACTIC ACID
AND PROCESS FOR MAKING SAME

Houston V. Claborn, Arlington, Va., dedicated to the free use of the People in the territory of the United States No Drawing. Application October 25, 1943,
Serial No. 507,605

7 Claims. (Cl. 260—484)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to esters of acetyllactyllactic acid having the structural formula,

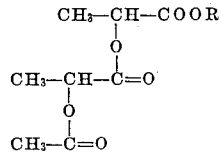

where R is an alkyl or substituted alkyl group.

The object of this invention is the preparation of esters of acetyllactyllactic acid, a series of new and useful compounds which are colorless, odorless liquids of low vapor pressures.

The compounds of this invention are slightly soluble in water and are completely miscible with benzene. They are good plasticizers, especially for cellulose derivatives, and good solvents, especially for synthetic resins.

I have found that these compounds may be easily and efficiently prepared by causing esters of lactyllactic acid of the series disclosed in my copending application, Serial No. 507,604, filed Oct. 25, 1943, for example, to react with an acetylating agent, such as ketene or acetic anhydride, in the presence of an acetylating catalyst.

The esters of lactyllactic acid, which are employed as a starting material in this invention, are produced, according to the disclosures of the above-mentioned patent application, by reacting dry lactide with an anhydrous alcohol in the presence of an acid catalyst, such as sulphuric acid, hydrochloric acid, benzene sulphonic acid, and so forth. The reaction is accomplished by heating a mixture of the dry lactide and the desired anhydrous alcohol at a temperature of about from 70° to 90° C. for a period of about from 6 hours to 8 hours in the presence of the acid catalyst. An excess of the alcohol may be used to provide a solvent, or the alcohol and lactide may be used in equal molecular proportions and an inert organic liquid, such as benzene, used as the solvent in the reaction mixture.

Under these conditions, lactide is caused to react with alcohol in such a way that only one of the ester groups in the lactide ring is affected by the alcoholysis reaction, as represented by the reaction equation,

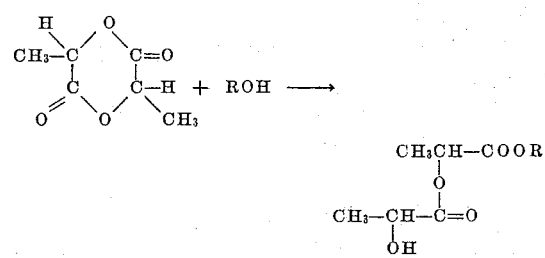

where R is an alkyl group or substituted alkyl group.

Methyl, ethyl, n-butyl, n-hexyl, phenylethyl, tetrahydrofurfuryl, and beta-hydroxy ethyl are given as examples of the esters of lactyllactic acid which may be used as the starting material in this invention, but the invention is not limited to these, as any alkyl or substituted alkyl ester of lactyllactic acid may be employed.

The invention is specifically exhibited by the following examples:

Example I

One hundred grams of ethyl lactyllactate, containing one drop of concentrated sulphuric acid, was treated by adding ketene at the rate of 0.28 mole of ketene per hour for 4 hours with stirring, and the reaction product was left standing overnight.

The ethyl acetyllactyllactate fraction, which distilled from the reaction product at 118° to 126° C. at 8 mm. pressure, weighed 115 g. It redistilled at 92° C. at 1.0 mm. pressure, resulting in a colorless liquid at 25° C., identified as ethyl acetyllactyllactate having the formula, $$CH_3CH(CH_3CH(CH_3COO)COO)COOC_2H_5$$

It has a specific gravity of about 1.1101 at 25° C., and a refractive index for the yellow sodium line of about 1.4243 at 20° C.

Example II

One hundred seventy-six grams of methyl lactyllactate (1 mole), containing one drop of concentrated sulphuric acid, was treated by adding ketene at the rate of 0.28 mole per hour for 8 hours with stirring, and the reaction product was left standing overnight.

The methyl acetyllactyllactate fraction, which distilled from the reaction product at 118° to 119° C. at 7.3 mm. pressure, weighed 197 g. It redistilled at 118° C. at 7.0 mm., or at 81° C. at 0.7 mm. pressure, resulting in a colorless liquid at 25° C., identified as methyl acetyllactyllactate having the formula, $$CH_3CH(CH_3CH(CH_3COO)COO)COOCH_3$$

It has a specific gravity of about 1.1400 at 25° C., and a refractive index for the yellow sodium line of about 1.4244 at 20° C.

*Example III*

One hundred grams of n-butyl lactyllactate (½ mole), containing one drop of concentrated sulphuric acid, was treated by adding ketene at the rate of 0.28 mole per hour for 4 hours with stirring, the temperature being kept at about 50° C., and the reaction product was left standing overnight.

The n-butyl acetyllactyllactate fraction, which distilled from the reaction product at 111° to 114° C. at 1.3 mm. pressure, weighed 124 g. It redistilled at 108° C. at 1.2 mm. pressure, or at 78° C. at 0.4 mm. pressure, resulting in a colorless liquid at 25° C., identified as n-butyl acetyllactyllactate having the formula, $$CH_3CH(CH_3CH(CH_3COO)COO)COOC_4H_9$$

It has a specific gravity of about 1.0660 at 25° C. and a refractive index for the yellow sodium line of about 1.4273 at 20° C.

*Example IV*

One hundred three grams of beta-hydroxyethyl lactyllactate (½ mole), containing one drop of concentrated sulphuric acid, was treated by adding slowly 120 g. of acetic anhydride to the lactyllactate with stirring, and the acetic acid and excess acetic anhydride were removed by distillation at reduced pressure. The residue, which weighed 145 g., was diluted with ether and washed three times with water, and then dried over anhydrous sodium sulphate. The ether was removed by distillation, the final traces being removed at reduced pressure.

The colorless, water-insoluble beta-acetoxyethyl acetyllactyllactate thus obtained weighed 134 g.

Having thus described the invention, what is claimed is:

1. A process of preparing esters of acetyllactyllactic acid comprising causing esters of lactyllactic acid to react with an acetylating agent.

2. A process of preparing esters of acetyllactyllactic acid comprising causing esters of lactyllactic acid to react with ketene.

3. A process of preparing esters of acetyllactyllactic acid comprising causing esters of lactyllactic acid to react with ketene in the presence of an acetylating catalyst.

4. A process of preparing esters of acetyllactyllactic acid comprising causing esters of lactyllactic acid to react with acetic anhydride in the presence of an acetylating catalyst.

5. As a new composition of matter, the product ethyl acetyllactyllactate, having the formula, $$CH_3CH(CH_3CH(CH_3COO)COO)COOC_2H_5$$

being a colorless liquid at 25° C., boiling at about 92° C. at 1.0 mm. pressure, having a specific gravity of about 1.1101 at 25° C., and having a refractive index for the yellow sodium line of about 1.4243 at 20° C.

6. As a new composition of matter, the product methyl acetyllactyllactate, having the formula, $$CH_3CH(CH_3CH(CH_3COO)COO)COOCH_3$$

being a colorless liquid at 25° C., boiling at about 81° C. at 0.7 mm. pressure, having a specific gravity of about 1.1400 at 25° C. and having a refractive index for the yellow sodium line of about 1.4244 at 20° C.

7. As a new composition of matter, the product n-butyl acetyllactyllactate, having the formula, $$CH_3CH(CH_3CH(CH_3COO)COO)COOC_4H_9$$

being a colorless liquid at 25° C., boiling at about 78° C. at 0.4 mm. pressure, having a specific gravity of about 1.0660 at 25° C., and having a refractive index for the yellow sodium line of about 1.4273 at 20° C.

HOUSTON V. CLABORN.